United States Patent
Chen et al.

(10) Patent No.: US 12,241,842 B2
(45) Date of Patent: Mar. 4, 2025

(54) OPTICAL SPECTRA RECONSTRUCTION BASED ON OPTICAL MEASUREMENTS OF DOWNHOLE FLUIDS

(71) Applicant: Halliburton Energy Services, Inc., Houston, TX (US)

(72) Inventors: Zhonghuan Chen, Singapore (SG); Bin Dai, Katy, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 335 days.

(21) Appl. No.: 17/941,144

(22) Filed: Sep. 9, 2022

(65) Prior Publication Data

US 2024/0085341 A1    Mar. 14, 2024

(51) Int. Cl.
  *G01N 21/85* (2006.01)

(52) U.S. Cl.
  CPC . *G01N 21/8507* (2013.01); *G01N 2021/8571* (2013.01)

(58) Field of Classification Search
  CPC ............... G01N 21/31; G01N 21/8507; G01N 2021/8571; E21B 49/0875; E21B 49/08; E21B 47/113; E21B 47/06; E21B 47/07; G01V 20/00; G01V 13/00
  See application file for complete search history.

(56) References Cited

U.S. PATENT DOCUMENTS

| | | | |
|---|---|---|---|
| 10,927,672 B2 | 2/2021 | Dai et al. | |
| 2012/0211650 A1* | 8/2012 | Jones | E21B 49/10 250/269.1 |
| 2015/0204189 A1* | 7/2015 | Indo | G01N 21/359 356/440 |
| 2015/0354353 A1 | 12/2015 | Indo et al. | |
| 2016/0169794 A1 | 6/2016 | Powers et al. | |
| 2017/0145822 A1* | 5/2017 | Rowe | E21B 21/08 |
| 2017/0269260 A1* | 9/2017 | Chen | E21B 49/08 |
| 2019/0063215 A1* | 2/2019 | Dai | H03M 7/3062 |
| 2020/0257654 A1 | 8/2020 | Chen et al. | |
| 2020/0284942 A1* | 9/2020 | Chen | G01V 8/00 |
| 2021/0040845 A1* | 2/2021 | LeBlanc | G01N 21/80 |

OTHER PUBLICATIONS

International Search Report & Written Opinion; PCT Application No. PCT/US2022/043194; mailed Jun. 2, 2023.

* cited by examiner

*Primary Examiner* — Sang H Nguyen
(74) *Attorney, Agent, or Firm* — NOVAK DRUCE CARROLL LLP (57) ABSTRACT

Systems and methods are provided for determining the wideband spectrum of downhole fluids based on downhole optical measurements. In some aspects, a plurality of optical data measurements associated with a subsurface fluid can be obtained from a subsurface optical measurement device. In some cases, a comparison can be made between the plurality of optical data measurements associated with the subsurface fluid and one or more sets of optical data stored in an optical data library. In some examples, the one or more sets of optical data can correspond to a plurality of different fluid samples. In some instances, a first fluid sample from the plurality of fluid samples that corresponds to at least a portion of the subsurface fluid can be identified based on the comparison. In some aspects, an absorbance spectrum of the subsurface fluid can be determined based on the first fluid sample.

20 Claims, 9 Drawing Sheets

OPTICAL SPECTRA RECONSTRUCTION BASED ON OPTICAL MEASUREMENTS OF DOWNHOLE FLUIDS

TECHNICAL FIELD

The present disclosure relates generally to systems and methods for optical spectra reconstruction, and more specifically (although not necessarily exclusively), to systems and methods for determining the optical spectra of wellbore fluids based on downhole optical measurements.

BACKGROUND

In the field of oil and gas exploration and production, contamination analysis and composition analysis are important aspects of subsurface formation testing and fluid sampling. For example, the characterization of reservoir or wellbore fluid compositions is desirable to determine the quality of a product or the condition of a container, a wellbore, or a pipeline, and/or to adjust and modify drilling parameters. In some cases, optical spectral analysis can be used to learn the contamination level and the fluid composition. For instance, a spectral laboratory can be used to test downhole fluid samples in order to determine the contamination level and the fluid composition. However, the physical and chemical properties of the fluid samples that are measured at the surface may not be accurate due to the changes in pressure and temperature that occur during the transfer of the sample from the wellbore to the surface.

Consequently, it may be preferable to perform subsurface optical measurements of the fluid samples in order to mitigate the problems associated with surface spectral analysis. However, subsurface spectral analysis presents additional challenges because the size of the tools that can be used to obtain the optical measurements in a downhole environment is limited. Further, such tools must be robustly designed to operate in harsh environments with high temperatures and high pressure.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As discussed previously, contamination analysis and composition analysis play significant roles in subsurface formation testing and fluid sampling. To avoid issues associated with surface spectral analysis (e.g., temperature and pressure variations), systems can be configured to perform subsurface optical measurements and analysis. However, subsurface optical measurement devices are limited in size and cannot be feasibly configured to directly measure wideband absorbance spectrum. Although measurements can be obtained on the narrow band spectrum (e.g., selected wavelengths), such an approach does not accurately characterize the fluid sample. Furthermore, reconstruction of the wideband absorbance spectrum based on optical measurements requires use of inversion-based methods that are non-linear because the absorbance spectrum has an exponential relationship with observed optical data. In addition, the inversion process can be underdetermined due to the limited number of measurements.

The disclosed technology addresses the foregoing by providing methods and systems for reconstructing wideband optical spectra based on downhole optical measurements. In particular, the present technology can be used to reconstruct the wideband absorbance spectrum using a limited number of observed optical data. The present technology provides reconstructed spectra that can be reliably used to perform contamination analysis as well as composition analysis.

In some aspects, a method can include obtaining, from a subsurface optical measurement device, a plurality of optical data measurements associated with a subsurface fluid. A comparison can be made between the plurality of optical data measurements associated with the subsurface fluid and one or more sets of optical data stored in an optical data library. The one or more sets of optical data can correspond to a plurality of different fluid samples. A first fluid sample from the plurality of different fluid samples that corresponds to at least a portion of the subsurface fluid can be identified based on the comparison. In some aspects, an absorbance spectrum of the subsurface fluid can be determined based on the first fluid sample.

In some cases, an apparatus can include at least one memory comprising instructions and at least one processor configured to execute the instructions and cause the apparatus to obtain, from a subsurface optical measurement device, a plurality of optical data measurements associated with a subsurface fluid. The apparatus can perform a comparison between the plurality of optical data measurements associated with the subsurface fluid and one or more sets of optical data stored in an optical data library. In some cases, the one or more sets of optical data can correspond to a plurality of different fluid samples. The apparatus can identify, based on the comparison, a first fluid sample from the plurality of different fluid samples that corresponds to at least a portion of the subsurface fluid. In some aspects, the apparatus can determine an absorbance spectrum of the subsurface fluid based on the first fluid sample.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
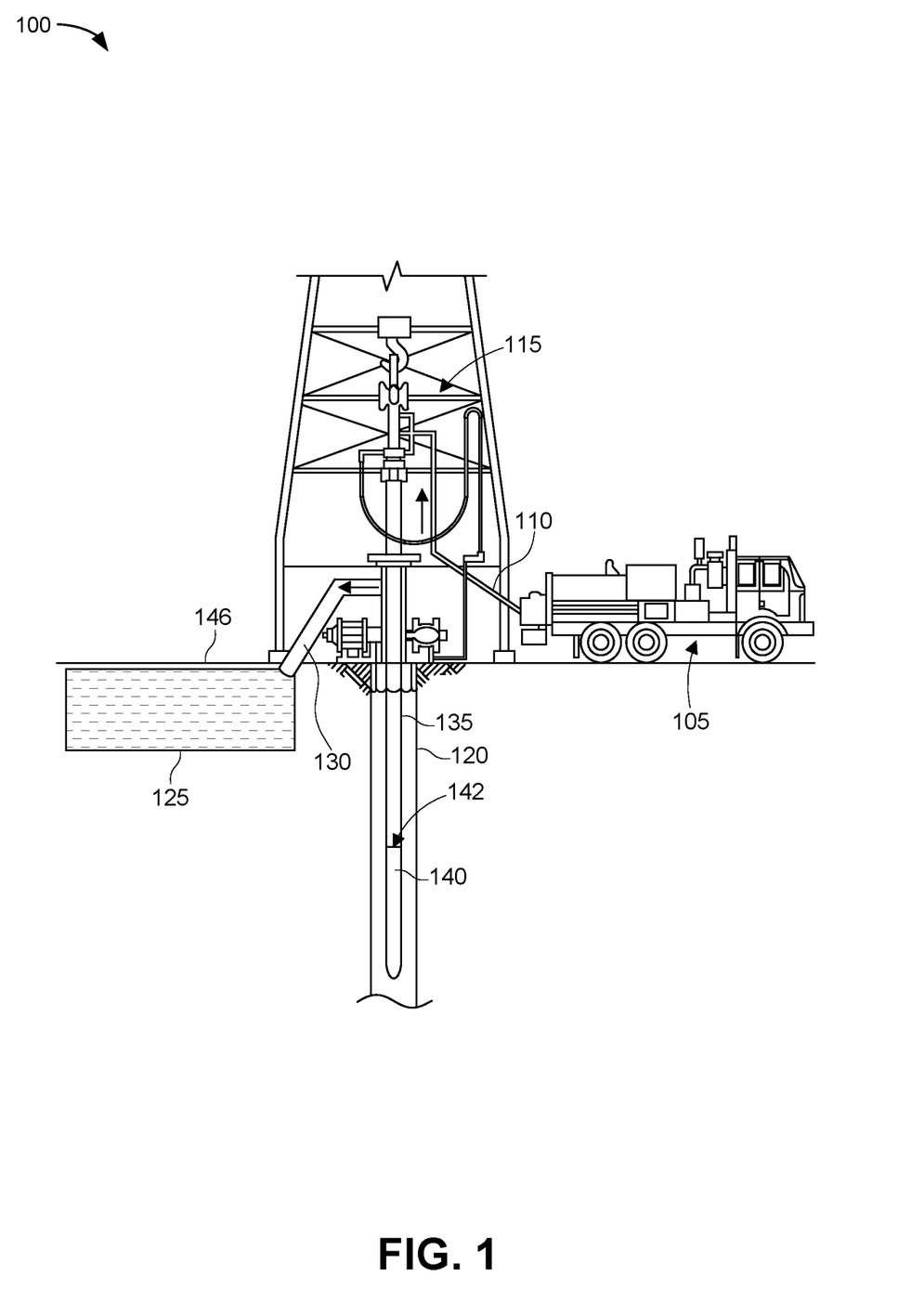
FIG. 1 is a system diagram of a wellbore environment, in accordance with aspects of the present disclosure.

FIG. 1 illustrates an exemplary downhole environment 100 in which the present disclosure may be implemented. In some cases, the cement unit 105, which may be a truck as shown, may include mixing equipment and pumping equipment. In some examples, the cement unit 105 may pump a cement slurry (e.g., cement composition) through a feed pipe 110 and to a cement head 115 which can convey the cement, or other fluid, downhole, for example into the wellbore 120. In some instances, a retention pit 125 may be provided into which displaced fluids from the wellbore 120 may flow via line 130 (e.g., a mud pit).

In some examples, a casing 135 may be inserted from the surface 146 of the earth into the wellbore 120. In some cases, the casing 135 may be a plurality of individual tubes or joints. In some embodiments, the casing 135 may include a reverse cementing apparatus 140 on the downhole end 142 thereof, the uphole end being toward the surface 146. In some aspects, the reverse cementing apparatus 140 may correspond to a shoe joint (e.g., a shoe, shoe track, float joint, float shoe, casing shoe, etc.).

In some instances, during a Run-In-Hole stage the casing 135 may be inserted into the wellbore 120. During this stage, fluid may be pumped through the casing 135 in a downhole direction toward the end of the wellbore 120. Once the reverse cementing apparatus 140 is positioned in the desired location in the wellbore 120 then reverse cementing operations may be started. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure.

Figure 2:
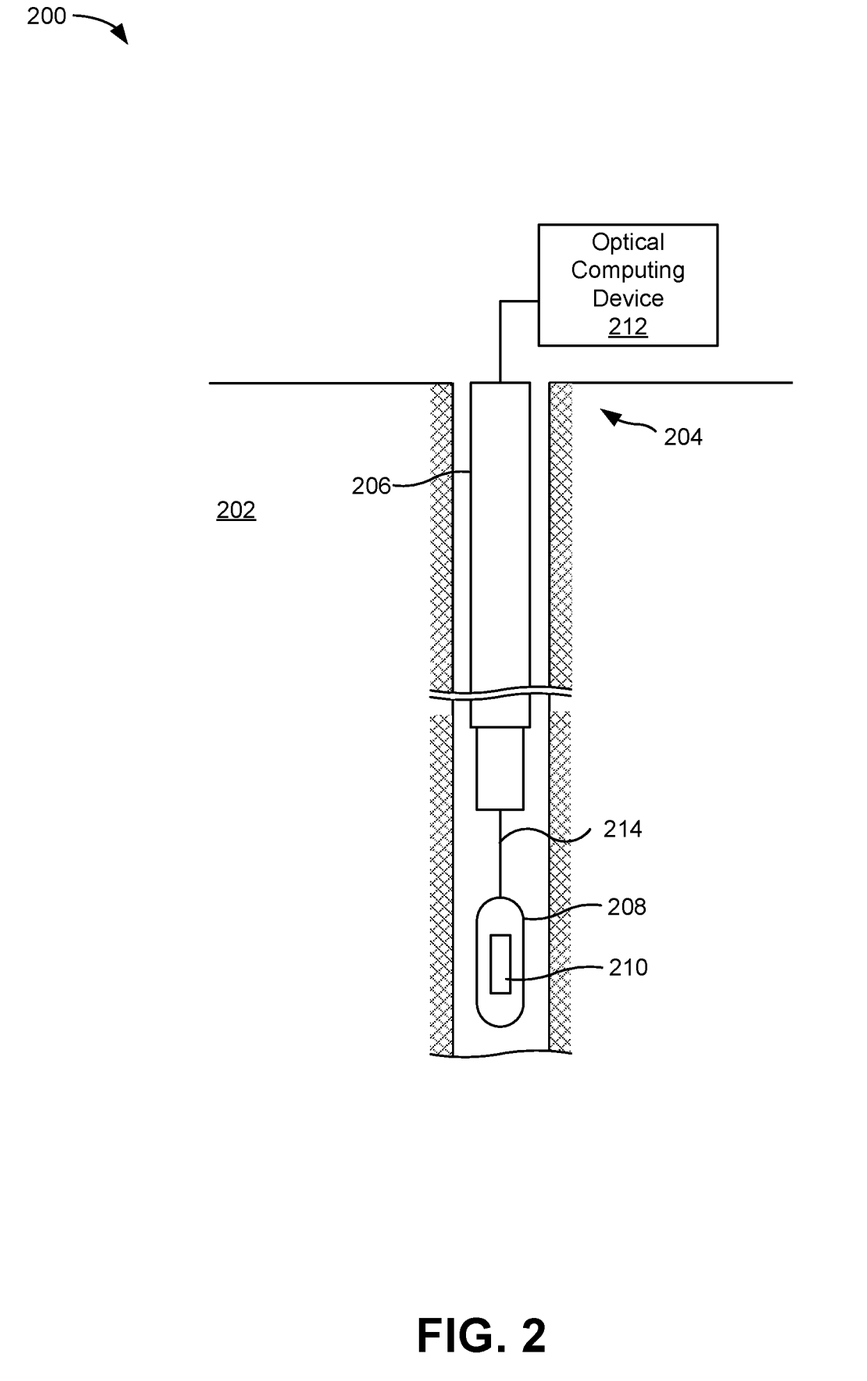
FIG. 2 is a diagram of a wireline system configured to obtain downhole optical measurements, in accordance with aspects of the present disclosure.

FIG. 2 is a system diagram of a wellbore environment 200 configured to measure a formation fluid(s) during formation testing and sampling. As illustrated, a wellbore 204 penetrates a portion of subterranean formation 202. In some aspects, the wellbore environment 200 may include a casing 206 (e.g., a casing string or a pipe string that may be a single pipe string or a joined pipe string). In some examples, casing 206 may include other equipment for placing the casing 206 into the wellbore 204, such as a shoe, a float collar, a centralizer, etc.

In some cases, wellbore environment 200 may include a downhole tool 208 that forms part of a wireline logging operation. In some instances, downhole tool 208 (e.g., probe or sonde) can be lowered by wireline or logging cable 214 into wellbore 204. For example, downhole tool 208 may be lowered to a potential production zone or a region of interest in wellbore 204 and may be used with other components of the formation tester (e.g., packers, pumps, etc.) to perform well testing and sampling.

In some aspects, the downhole tool 208 can include a subsurface optical measurement device 210. In some examples, subsurface optical measurement device 210 can be configured to measure optical responses (e.g., optical density, light energy, etc.) of the formation fluids (e.g., sample fluids) in wellbore 204.

Figure 3:
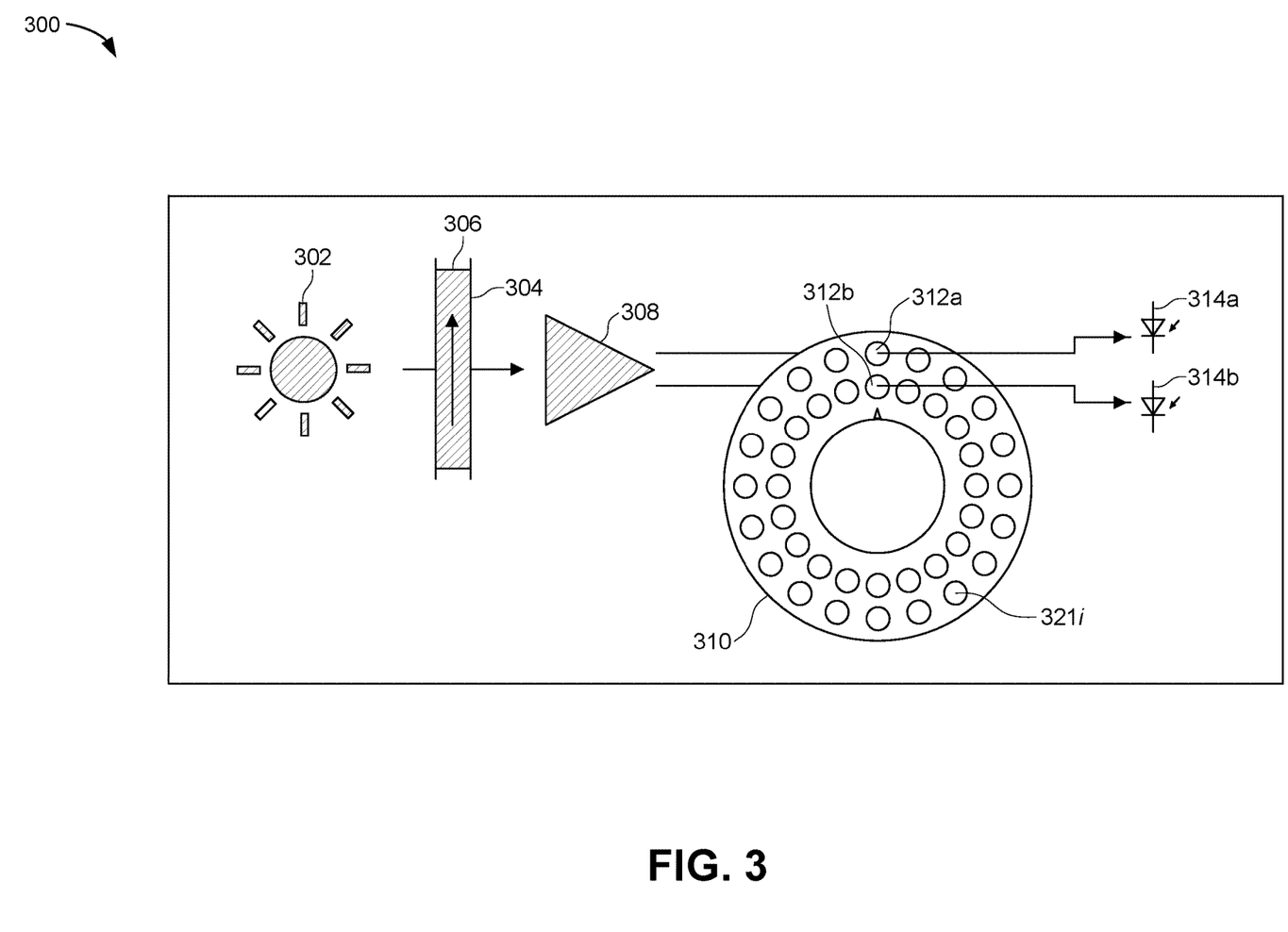
FIG. 3 is a diagram of subsurface optical measurement device, in accordance with aspects of the present disclosure.

FIG. 3 illustrates an example of a subsurface optical measurement device 300. In some aspects, subsurface optical measurement device 300 can correspond to subsurface optical measurement device 210. In some examples, subsurface optical measurement device 300 can include a light source 302. In some instances, light source 302 may be a broadband lamp with a tungsten light bulb, a laser, a light-emitting diode (LED), or any other source of electromagnetic radiation. In some cases, light source 302 may be configured to direct light (e.g., illuminate) fluid sample 306. In some aspects, fluid sample 306 may flow through transparent pipe 304 (e.g., a transparent tube or conduit). In some instances, light source 302 may direct light toward fluid sample 306 as it flows through transparent pipe 304.

In some aspects, subsurface optical measurement device 300 may include an optical multiplexer 308. In some cases, optical multiplexer 308 may separate light into multiple beams that can be directed toward one or more optical filters 312$a$, 312$b$ . . . 312$i$ (collectively referred to as "optical filters 312") within optical filter bank 310. In some instances, optical multiplexer 308 may include a free-space multiplexer, a waveguide multiplexer, a fiber-optic multiplexer, and/or any other type of optical multiplexer. In some examples, optical multiplexer 308 can include a beam splitter, a lens, an arrayed waveguide grating, and/or any combination thereof.

In some examples, optical multiplexer 308 may be configured to spatially separate light into portions that are directed to one or more of the optical filters 312. In some cases, optical filter bank 310 may correspond to a stationary structure that is aligned with one or more of the outputs of optical multiplexer 308. In some aspects, optical filter bank 310 may include a rotating wheel in which optical filters 312 are disposed on the plane of the wheel. In some examples, the rotating wheel corresponding to optical filter bank 310 may rotate about an axis that is parallel to the output of optical multiplexer 308. In one illustrative example, optical filter bank 310 may rotate in a manner that aligns one or more optical filters 312 with the light outputted by optical multiplexer 308.

In some aspects, subsurface optical measurement device 300 may include one or more light detectors (e.g., photodetector 314$a$ and photodetector 314$b$, collectively referred to as "photodetectors 314"). In some examples, photodetectors 314 can be configured to detect or measure the light energy (e.g., optical density) of the light after it passes through optical filters 312. In some cases, the light energy measured or recorded by photodetectors 314 can be expressed according to equation (1), as follows:

$$d_i = \int 10^{-A(\lambda)} f_i(\lambda) d\lambda \quad (1)$$

In some examples relating to equation (1), i can correspond to the index of optical filters 312; $d_i$ can correspond to the observed light energy on the i-th optical filter (e.g., optical filter 312i); $A(\lambda)$ can correspond to the unknown absorbance spectrum of the fluid sample 306; and $f_i(\lambda)$ can correspond to the transfer function for the corresponding i-th optical filter (e.g., transfer function associated with optical filter 312i).

Figure 4:
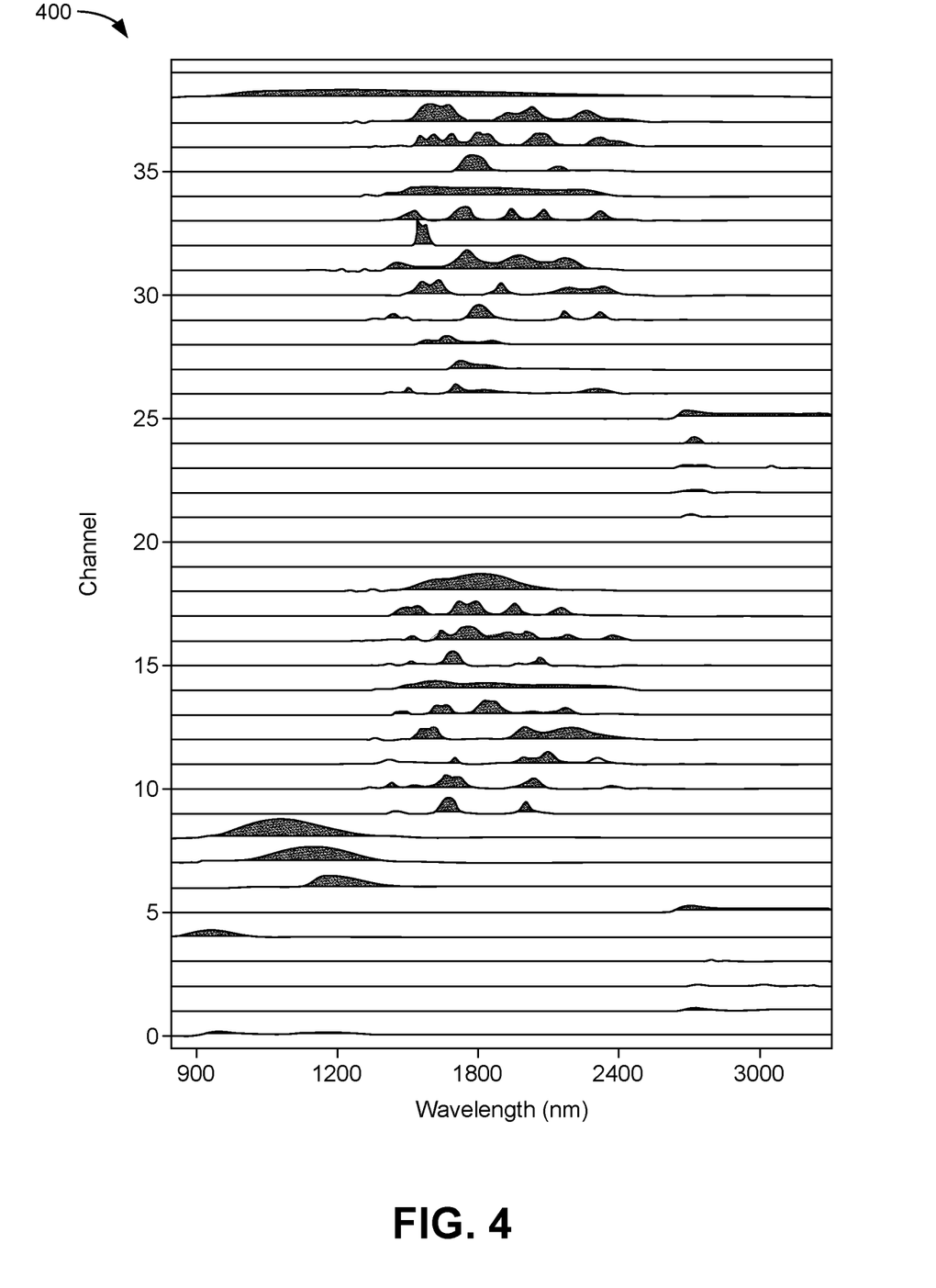
FIG. 4 is a graph illustrating an example filter configuration for use with a subsurface optical measurement device, in accordance with aspects of the present disclosure.

FIG. 4 illustrates a graph 400 with an example configuration of the transfer functions associated with optical filters 312. As illustrated in graph 400, subsurface optical measurement device 300 may be configured to have 40 optical filters 312 (e.g., 40 channels for measuring light energy). In some cases, optical filters 312 may be configured to attenuate, amplify, and/or pass-through different wavelengths of electromagnetic radiation in accordance with the waveforms illustrated in graph 400. In some examples, one or more of the optical filters 312 may be configured to block all light in order to obtain a baseline measurement of the environment (see, e.g., channel 20 in graph 400).

Returning to FIG. 2, in some examples, optical measurements obtained by subsurface optical measurement device 210 (e.g., subsurface optical measurement device 300) and/or any other measurement data generated by downhole tool 208 can be communicated to one or more computing devices for further processing. For example, optical measurements obtained by subsurface optical measurement device 210 can be transmitted to optical computing device 212. In some cases, optical computing device 212 may be configured to process the optical measurements in order to reconstruct the wideband absorbance spectra corresponding to the formation fluid (e.g., fluid sample 306).

In some aspects, the optical measurement obtained by subsurface optical measurement device 210 can correspond to light energy measurements (e.g., $d_i$ in equation (1) above). In some cases, optical computing device 212 can reconstruct the absorbance spectrum $A(\lambda)$ of a fluid sample based on the light energy measurements received from subsurface optical measurement device 210. In some examples, the inversion for the unknown spectrum $A(\lambda)$ may be highly underdetermined because of the size limitation of subsurface optical measurement device 210 (e.g., limited number of optical filters 312). In some cases, reliability of the inversion calculation (e.g., calculation of the absorbance spectrum $A(\lambda)$ based on measurements $d_i$) can be improved by using a spectral library consisting of fluid samples that can be measured to obtain an optical data library.

In some aspects, the optical data library can be based on offline simulation and/or laboratory experiments that can be conducted on different fluid samples (e.g., fluid samples with known absorbance spectrum from the spectral library). In some cases, the optical data library can include light energy measurements or data corresponding to different fluid samples. In some examples, the optical data library can include different sets of light energy measurements or data based on pressure and/or temperature. In some instances, the light energy data can be obtained using an optical measurement device that is the same or similar to subsurface optical measurement device 210. For example, light energy measurements for a given sample can be obtained using an optical measurement device having the same optical filters 312 as the subsurface optical measurement device 210 that is used to measure fluid samples within wellbore 204. In some cases, the light energy measurements for a given sample can be obtained using a computer simulation (e.g., using transfer function corresponding to optical filters 312).

In some cases, the spectral library can be noted as $T_l(\lambda)$, $l \in L$. In some examples, the spectral library can be used to limit the solution space of the spectral inversion. In some aspects, the spectrum (e.g., $A(\lambda)$) can have a nonlinear relationship with the optical data (e.g., $d_i$). In some instances, the optical data for all samples in the spectral library can be simulated or measured prior to the spectral reconstruction to yield an optical data library $d_i^l$, as follows:

$$d_i^l = \int T_l(\lambda) f_i(\lambda) d\lambda \qquad (2)$$

In some examples, process of generating the optical data library (e.g., data simulation process) can correspond to a forward modelling process that uses the transfer functions of the optical filters and transmitting spectra. In some cases, the simulation process can be done offline to prepare the optical data library (e.g., the spectral library and/or the optical data library can be stored on optical computing device 212 prior to observance of practical field data).

In some aspects, optical computing device 212 can reconstruct the absorbance spectrum using a matching pursuit algorithm. For example, optical computing device 212 can use the spectral library (e.g., $T_l(\lambda)$, $l \in L$) and the optical data library (e.g., $d_i^l$) to reconstruct the unknown absorbance spectrum based on optical measurements $d_i$. In some cases, reconstruction of the absorbance spectrum can be done using an iterative algorithm, as follows:

$$T[k+1] = T[k] + c_b T_b(\lambda) \qquad (3)$$

In some examples relating to equation (3), $b \in L$ can correspond to the best matched sample in the spectral library at iteration step k, having the maximal of the normalized correlation coefficients, as follows:

$$b = \operatorname*{argmax}_{l \in L} c_l \qquad (4)$$

In some cases relating to equation (4), $c_l$ can correspond to the normalized correlation coefficient between the simulated data of sample l and the residual data r at the iteration step k as follows:

$$c_l = \frac{r^T d_l}{\sqrt{r^T r} \sqrt{d_l^T d_l}}, l \in L \qquad (5)$$

In some examples, the residual can be initialized as the observed optical data $r[0] = d$ and it can be updated as follows:

$$r[k+1] = r[k] - c_k d_b \qquad (6)$$

In some aspects, the energy of the residuals may be considered weak after performing one or more iterations. In some examples, the residual may be considered weak when it is nearly orthogonal to all of the samples in the sample data library. In some cases, optical computing device 212 can determine the absorbance spectrum $A(\lambda)$ from the transmitting spectrum as follows:

$$A(\lambda) = -\log_{10} T[k] \qquad (7)$$

Figure 5:
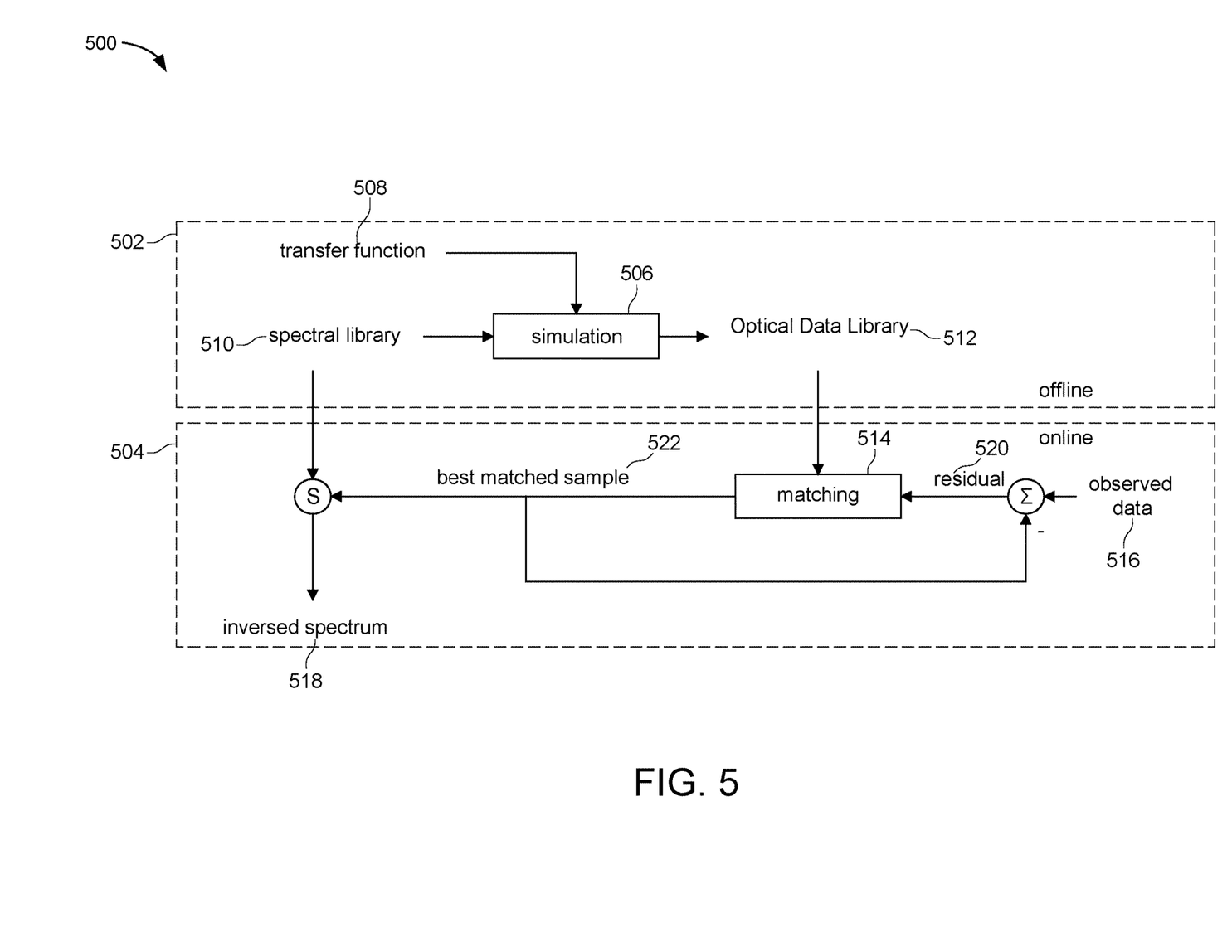
FIG. 5 is a diagram illustrating an algorithm for implementing spectral reconstruction, in accordance with aspects of the present disclosure.

FIG. 5 illustrates an algorithm 500 for implementing spectral reconstruction. In some aspects, algorithm 500 can include an offline portion 502 for generating an optical data library 512. In some examples, optical data library can be generated by performing simulation 506 using spectral library 510. In some cases, simulation 506 may include obtaining laboratory measurements using an optical measurement device (e.g., subsurface optical measurement device 300). In addition or as an alternative to laboratory measurements, simulation 506 may use computer algorithms to determine optical measurements (e.g., light energy, optical density, etc.) based on spectral library 510 and transfer function 508. In some cases, transfer function 508 can correspond to the transfer function associated with one or more optical filters (e.g., optical filters 312) that may be used by a subsurface optical measurement device (e.g., subsurface optical measurement device 210). In some aspects, optical data library can include measurements or simulation data corresponding to different temperatures and/or different pressures.

In some examples, algorithm 500 may include an online portion 504 for reconstructing absorbance spectrum of a downhole fluid. In some cases, online portion 504 may be performed by a computing device such as optical computing device 212 that can receive optical measurements (e.g., observed data 516) from a subsurface optical measurement device. In some aspects, optical computing device 212 may reconstruct absorbance spectrum of a fluid sample using a matching pursuit algorithm such as matching algorithm 514. In some cases, matching algorithm 514 can use observed data (e.g., data from subsurface optical measurement device 210) to determine a best matched sample based on a comparison with data from optical data library 512. In some cases, matching algorithm 514 may perform the comparison by selecting sets of optical data from optical data library 512 based on the pressure and/or temperature associated with observed data 516. In some examples, matching algorithm 514 may be performed using an iterative algorithm that continues matching algorithm 514 to identify any residual portions (e.g., residual 520) of the fluid sample.

In some examples, the output(s) of matching algorithm 514 can include one or more best matched samples (e.g., best matched sample 522) corresponding to the observed data 516 from the fluid sample. In some cases, the output(s) of matching algorithm 514 can be compared with spectral library 510 to identify inversed spectrum 518 (e.g., absorbance spectrum) associated with the fluid sample.

Figure 6:
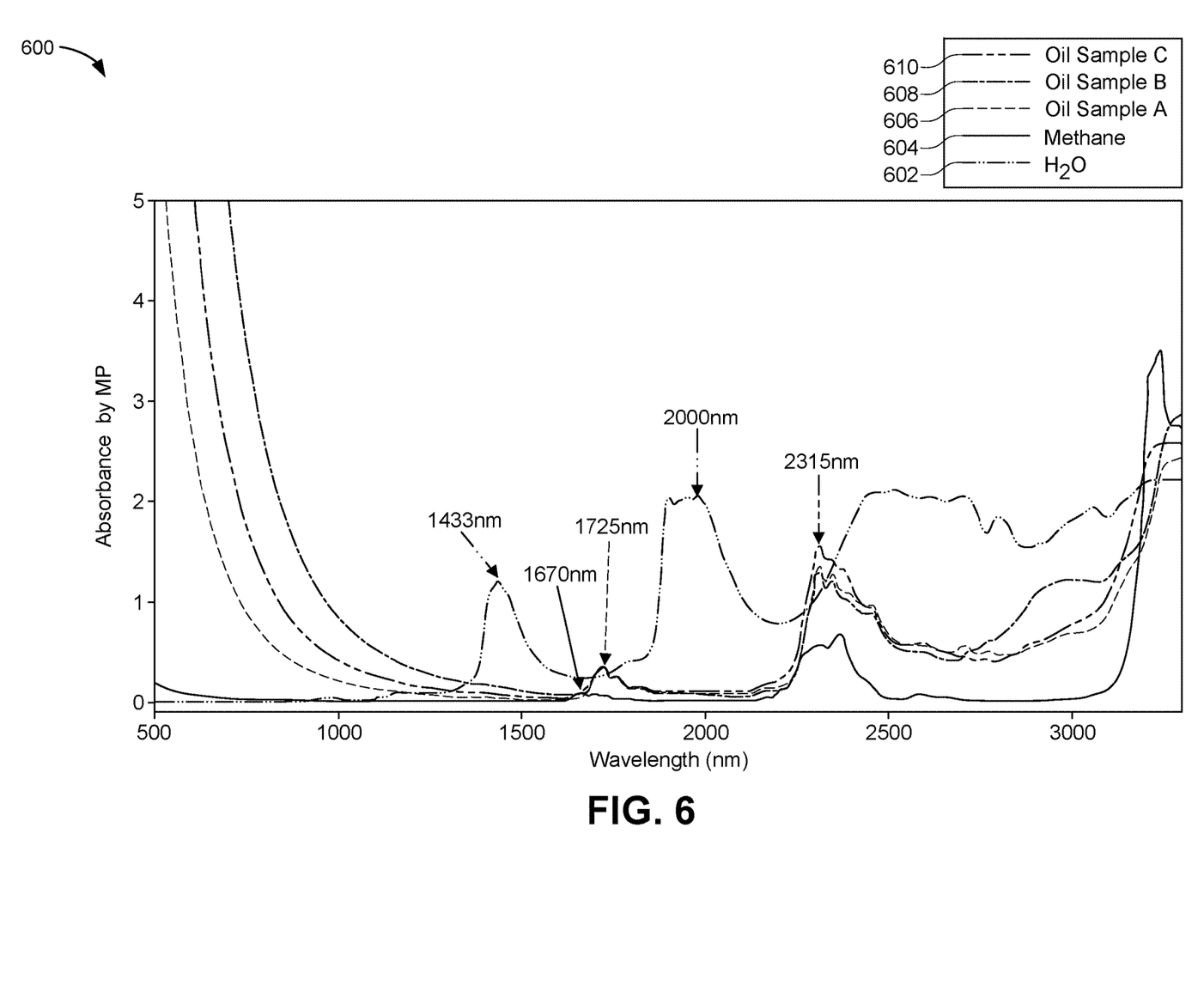
FIG. 6 is a graph illustrating reconstructed spectra of fluid samples, in accordance with aspects of the present disclosure.

FIG. 6 is a graph 600 illustrating reconstructed spectra of five fluid samples (e.g., water 602, methane 604, oil sample A 606, oil sample B 608, and oil sample C 610). In some aspects, the reconstructed spectra illustrated in graph 600 can correspond to reconstructed spectra using the present technology (e.g., inversed spectrum 518 which is output of algorithm 500). In some examples, the reconstructed spectra can be used to identify the absorbance peak of methane 604 (e.g., approximately 1670 nanometers (nm)). In some cases, the reconstructed spectra can be used to identify the absorbance peaks of water 602 (e.g., approximately 1433 nm and 2000 nm). In some instances, the reconstructed spectra can be used to identify the absorbance peaks of oil sample A 606, oil sample B 608, and oil sample C 610 (e.g., the oil samples have absorbance peaks at approximately 1725 nm and 2315 nm).

Figure 7:
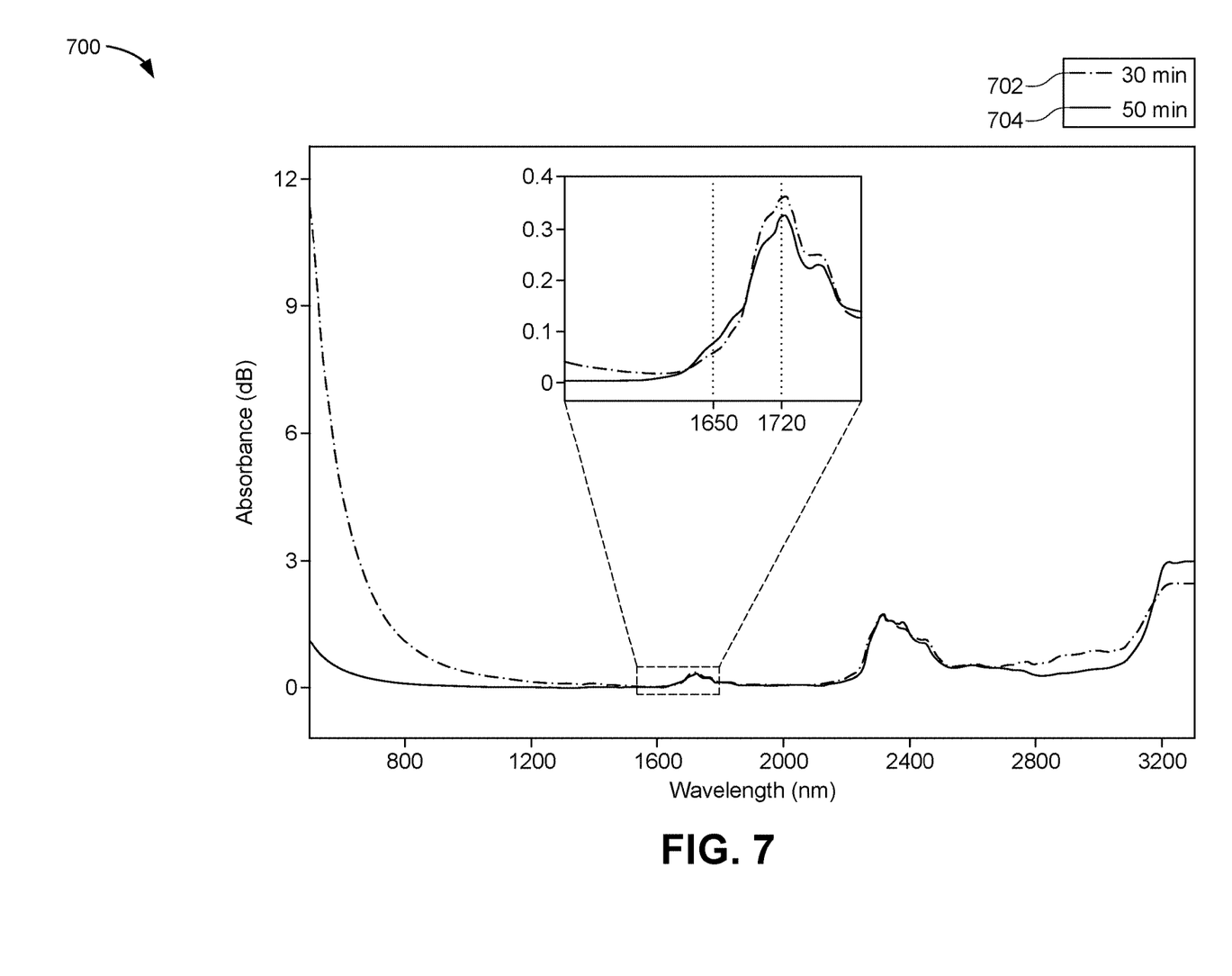
FIG. 7 is a graph illustrating reconstructed spectra of a fluid sample at different time intervals, in accordance with aspects of the present disclosure.

FIG. 7 is a graph 700 illustrating reconstructed spectra of a fluid sample at different time intervals. In some aspects, the reconstructed spectra illustrated in graph 700 can correspond to reconstructed spectra using the present technology (e.g., inversed spectrum 518 which is output of algorithm 500). As illustrated, spectra 702 can correspond to reconstructed spectra generated based on optical measurements obtained from a fluid sample after 30 minutes of pumping at a field well in a gas reservoir and spectra 704 can correspond to reconstructed spectra generated based on optical measurements obtained from a fluid sample after 50 minutes of pumping the same field well.

In some cases, the reservoir fluid samples can have gas compositions that are not present in oil-based mud. In some examples, as the mud fluid decreases during pumping (e.g., from 30 minute mark to 50 minute mark), the gas in the fluid sample is expected to increase due to the hydrocarbon fluid. As illustrated in FIG. 7, the reconstructed spectra 704 corresponding to the 50 minute mark is higher at 1650 nm (e.g., absorbance peak of gas) than the reconstructed spectra 702 corresponding to the 30 minute mark. In addition, the reconstructed spectra 704 corresponding to the 50 minute mark is lower at 1720 nm (e.g., absorbance peak of oil) than the reconstructed spectra 702 corresponding to the 30 minute mark. The changes in time at the respective absorbance peaks (e.g., for oil and gas) can be used to determine a decrease in the mud contamination level as pumping continues (e.g., oil ratio decreases and the gas composition increases).

Figure 8:
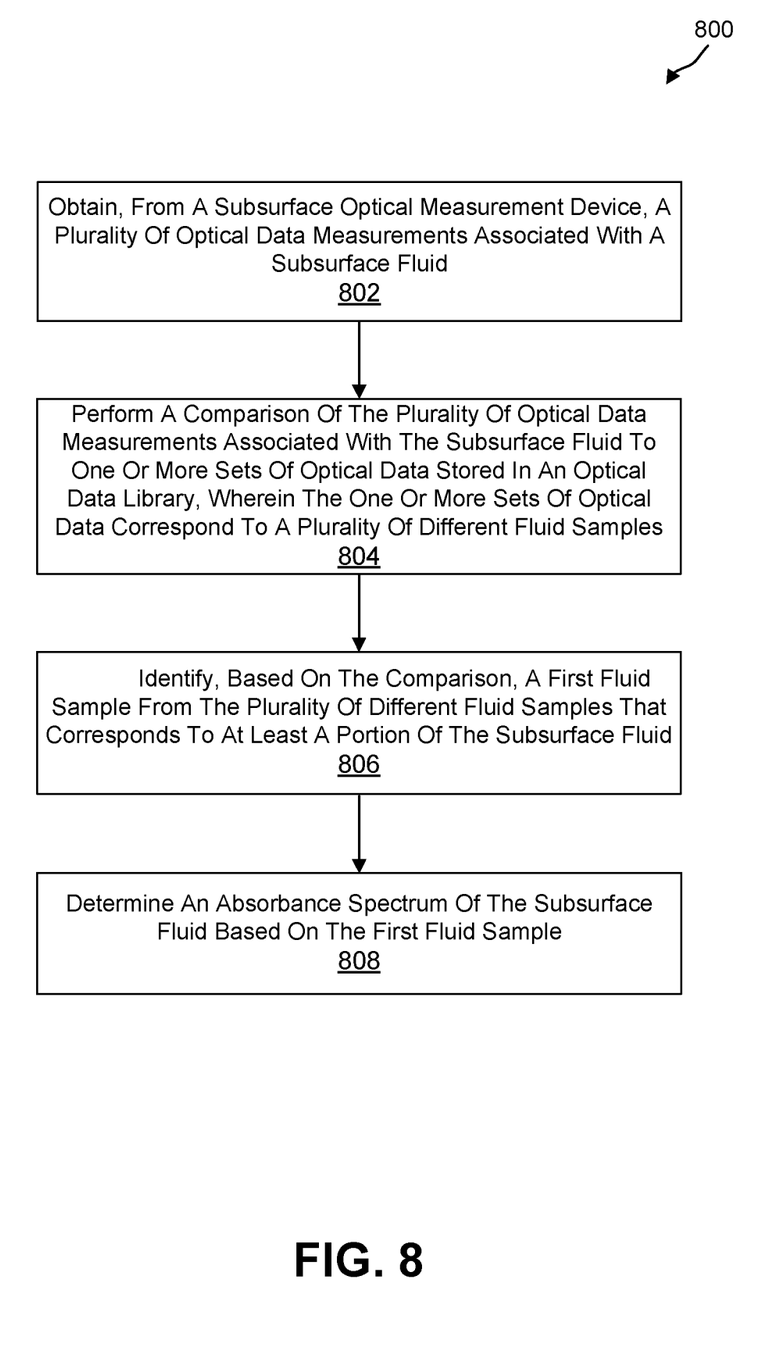
FIG. 8 is a flowchart diagram of a process of spectral reconstruction, in accordance with aspects of the present disclosure.

FIG. 8 illustrates an example of a process 800 for reconstructing absorbance spectra of downhole fluid samples. At block 802, the process 800 includes obtaining, from a subsurface optical measurement device, a plurality of optical data measurements associated with a subsurface fluid. For example, optical computing device 212 can obtain a plurality of optical data measurements associated with a subsurface fluid from subsurface optical measurement device 210. In some cases, each of the plurality of optical data measurements can correspond to a plurality of optical filters associated with the subsurface optical measurement device. For example, each of the data measurements obtained by subsurface optical measurement device 210 can correspond to one of optical filters 312. In some instances, at least one optical data measurement from the plurality of optical data measurements can correspond to a baseline optical measurement, wherein the baseline optical measurement can correspond to at least one optical filter from the plurality of optical filters that is configured to block light. For example, one of the optical filters 312 can be configured to block electromagnetic radiation (e.g., filer corresponding to channel 20 as illustrated in FIG. 4).

At block 804, the process 800 includes performing a comparison of the plurality of optical data measurements associated with the subsurface fluid to one or more sets of optical data stored in an optical data library, wherein the one or more sets of optical data correspond to a plurality of fluid samples. For instance, optical computing device 212 can compare (e.g., implement matching algorithm 514) the optical data measurements from subsurface optical measurement device 210 with one or more set of optical data corresponding to a plurality of fluid samples that are stored in an optical data library (e.g., optical data library 512). In some examples, the comparison can be based on a matching pursuit algorithm. For example, optical computing device 212 can perform the comparison in accordance with one or more of equations (1) to (7).

In some cases, one or more sets of optical data stored in the optical data library can be obtained from a laboratory optical measurement device configured to operate as the subsurface optical measurement device. For example, an optical measurement device having a configuration that is the same or similar to subsurface optical measurement device 300 can be used to test fluid samples and populate the optical data library. In some cases, the optical data library can be generated using computer simulation that are based on the transfer functions of the optical filters 312.

At block 806, the process 800 includes identifying, based on the comparison, a first fluid sample from the plurality of fluid samples that corresponds to at least a portion of the subsurface fluid. For example, optical computing device 212 can identify, based on the comparison, a best matched sample from spectral library 510.

At block 808, the process 800 includes determining an absorbance spectrum of the subsurface fluid based on the first fluid sample. For instance, optical computing device 212 can determine an absorbance spectrum of the subsurface fluid based on the best matched sample and the corresponding absorbance spectrum from spectral library 510.

In some cases, the process 800 can include determining at least one of a downhole temperature and a downhole pressure corresponding to the plurality of optical data measurements associated with a subsurface fluid and selecting the one or more sets of optical data for the comparison based on the downhole temperature or the downhole pressure, wherein each of the one or more sets of optical data are associated with at least one of a temperature parameter and a pressure parameter. For example, optical computing device 212 can determine downhole temperature and/or downhole pressure associated with the fluid sample and can select sets of optical data from optical data library that correspond to the temperature and/or pressure.

In some examples, the process 800 can include determining a composition of the subsurface fluid based on the absorbance spectrum. For example, the absorbance spectrum can be used to determine the composition of the downhole fluid. As illustrated in FIG. 6, the absorbance spectrum can be used to identify presence of water, methane, and oil. As illustrated in FIG. 7, the absorbance spectrum can be used to identify ratio of oil and gas at different time intervals. Those skilled in the art will recognize that the absorbance spectrum can be used to identify any number of materials, elements, compositions, etc.

In some aspects, the process 800 can include identifying, based on the comparison, a second fluid sample from the plurality of fluid samples that corresponds to a residual portion of the subsurface fluid, wherein the absorbance spectrum of the subsurface fluid is based on the first fluid sample and the second fluid sample. For instance, optical computing device 212 can perform an iterative algorithm as illustrated in FIG. 5 in which residual portions of the fluid sample can be identified by performing matching algorithm 514. The process can be repeated until coefficients associated with residuals are relatively low as compared to the best matched sample(s).

Figure 9:
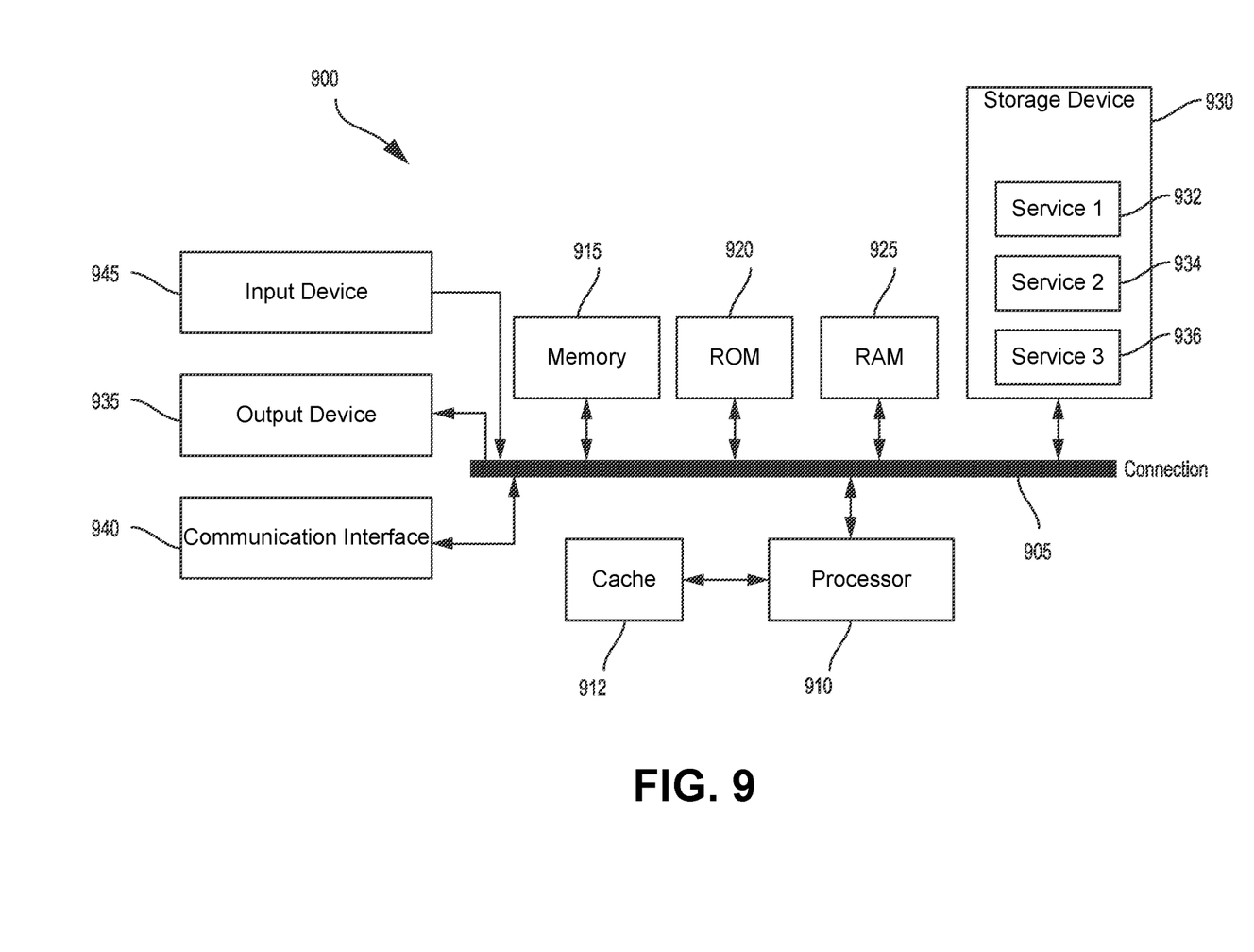
FIG. 9 is a block diagram illustrating an example computing device architecture, in accordance with aspects of the present disclosure.

FIG. 9 illustrates an example computing device architecture 900 which can be employed to perform various steps, methods, and techniques disclosed herein. Specifically, the techniques described herein can be implemented, at least in part, through the computing device architecture 900 in an applicable computing device, such as subsurface optical measurement device 210 and/or optical computing device 212. The various implementations will be apparent to those of ordinary skill in the art when practicing the present technology. Persons of ordinary skill in the art will also readily appreciate that other system implementations or examples are possible.

As noted above, FIG. 9 illustrates an example computing device architecture 900 of a computing device which can implement the various technologies and techniques described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B. Statements of the disclosure include:

Statement 1. A method comprising: obtaining, from a subsurface optical measurement device, a plurality of optical data measurements associated with a subsurface fluid; performing a comparison of the plurality of optical data measurements associated with the subsurface fluid to one or more sets of optical data stored in an optical data library, wherein the one or more sets of optical data correspond to a plurality of different fluid samples; identifying, based on the comparison, a first fluid sample from the plurality of different fluid samples that corresponds to at least a portion of the subsurface fluid; and determining an absorbance spectrum of the subsurface fluid based on the first fluid sample.

Statement 2: The method of statement 1, wherein each of the plurality of optical data measurements corresponds to a plurality of optical filters associated with the subsurface optical measurement device.

Statement 3: The method of statement 2, wherein at least one optical data measurement from the plurality of optical data measurements corresponds to a baseline optical measurement, wherein the baseline optical measurement corresponds to at least one optical filter from the plurality of optical filters that is configured to block light.

Statement 4: The method of any of statements 1 to 3, wherein the one or more sets of optical data stored in the optical data library are obtained from a laboratory optical measurement device configured to operate as the subsurface optical measurement device.

Statement 5: The method of any of statements 1 to 4, further comprising: determining at least one of a downhole temperature and a downhole pressure corresponding to the plurality of optical data measurements associated with a subsurface fluid; and selecting the one or more sets of optical data for the comparison based on the downhole temperature or the downhole pressure, wherein each of the one or more sets of optical data are associated with at least one of a temperature parameter and a pressure parameter.

Statement 6: The method of any of statements 1 to 5, wherein the comparison is based on a matching pursuit algorithm.

Statement 7: The method of any of statements 1 to 6, further comprising: determining a composition of the subsurface fluid based on the absorbance spectrum.

Statement 8: The method of any of statements 1 to 7, further comprising: identifying, based on the comparison, a second fluid sample from the plurality of different fluid samples that corresponds to a residual portion of the subsurface fluid, wherein the absorbance spectrum of the subsurface fluid is based on the first fluid sample and the second fluid sample.

Statement 10: An apparatus comprising at least one memory; and at least one processor coupled to the at least one memory, wherein the at least one processor is configured to perform operations in accordance with any one of statements 1 to 8.

Statement 11: An apparatus comprising means for performing operations in accordance with any one of statements 1 to 8.

Statement 12: A non-transitory computer-readable medium comprising instructions that, when executed by an apparatus, cause the apparatus to perform operations in accordance with any one of statements 1 to 8.

What is claimed is:

1. A method comprising:
   obtaining, from a subsurface optical measurement device, a plurality of optical data measurements associated with a subsurface fluid;
   performing a comparison of the plurality of optical data measurements associated with the subsurface fluid to one or more sets of optical data stored in an optical data library and one or more sets of data stored in a spectral library, wherein the one or more sets of optical data correspond to a plurality of different fluid samples;
   identifying, based on the comparison, a first fluid sample from the plurality of different fluid samples that corresponds to at least a portion of the subsurface fluid;
   determining an absorbance spectrum of the subsurface fluid based on the first fluid sample using a matching pursuit algorithm; and
   adjusting one or more drilling parameters based on the absorbance spectrum of the subsurface fluid.

2. The method of claim 1, wherein each of the plurality of optical data measurements corresponds to a plurality of optical filters associated with the subsurface optical measurement device.

3. The method of claim 2, wherein at least one optical data measurement from the plurality of optical data measurements corresponds to a baseline optical measurement, wherein the baseline optical measurement corresponds to at least one optical filter from the plurality of optical filters that is configured to block light.

4. The method of claim 1, wherein the one or more sets of optical data stored in the optical data library are obtained from a laboratory optical measurement device configured to operate as the subsurface optical measurement device.

5. The method of claim 1, further comprising:
determining at least one of a downhole temperature and a downhole pressure corresponding to the plurality of optical data measurements associated with a subsurface fluid; and
selecting the one or more sets of optical data for the comparison based on the downhole temperature or the downhole pressure, wherein each of the one or more sets of optical data are associated with at least one of a temperature parameter and a pressure parameter.

6. The method of claim 1, wherein the comparison is based on a matching pursuit algorithm.

7. The method of claim 1, further comprising:
determining a composition of the subsurface fluid based on the absorbance spectrum.

8. The method of claim 1, further comprising:
identifying, based on the comparison, a second fluid sample from the plurality of different fluid samples that corresponds to a residual portion of the subsurface fluid, wherein the absorbance spectrum of the subsurface fluid is based on the first fluid sample and the second fluid sample.

9. An apparatus comprising:
at least one memory comprising instructions; and
at least one processor configured to execute the instructions and cause the apparatus to:
obtain, from a subsurface optical measurement device, a plurality of optical data measurements associated with a subsurface fluid;
perform a comparison of the plurality of optical data measurements associated with the subsurface fluid to one or more sets of optical data stored in an optical data library and one or more sets of data stored in a spectral library, wherein the one or more sets of optical data correspond to a plurality of different fluid samples;
identify, based on the comparison, a first fluid sample from the plurality of different fluid samples that corresponds to at least a portion of the subsurface fluid;
determine an absorbance spectrum of the subsurface fluid based on the first fluid sample using a matching pursuit algorithm; and
adjust one or more drilling parameters based on the absorbance spectrum of the subsurface fluid.

10. The apparatus of claim 9, wherein each of the plurality of optical data measurements corresponds to a plurality of optical filters associated with the subsurface optical measurement device.

11. The apparatus of claim 10, wherein at least one optical data measurement from the plurality of optical data measurements corresponds to a baseline optical measurement, wherein the baseline optical measurement corresponds to at least one optical filter from the plurality of optical filters that is configured to block light.

12. The apparatus of claim 9, wherein the one or more sets of optical data stored in the optical data library are obtained from a laboratory optical measurement device configured to operate as the subsurface optical measurement device.

13. The apparatus of claim 9, wherein the at least one processor is further configured to cause the apparatus to:
determine at least one of a downhole temperature and a downhole pressure corresponding to the plurality of optical data measurements associated with a subsurface fluid; and
select the one or more sets of optical data for the comparison based on the downhole temperature or the downhole pressure, wherein each of the one or more sets of optical data are associated with at least one of a temperature parameter and a pressure parameter.

14. The apparatus of claim 9, wherein the comparison is based on a matching pursuit algorithm.

15. The apparatus of claim 9, wherein the at least one processor is further configured to cause the apparatus to:
determine a composition of the subsurface fluid based on the absorbance spectrum.

16. The apparatus of claim 9, wherein the at least one processor is further configured to cause the apparatus to:
identify, based on the comparison, a second fluid sample from the plurality of different fluid samples that corresponds to a residual portion of the subsurface fluid, wherein the absorbance spectrum of the subsurface fluid is based on the first fluid sample and the second fluid sample.

17. A non-transitory computer-readable storage medium having stored thereon instructions which, when executed by one or more processors, cause the one or more processors to:
obtain, from a subsurface optical measurement device, a plurality of optical data measurements associated with a subsurface fluid;
perform a comparison of the plurality of optical data measurements associated with the subsurface fluid to one or more sets of optical data stored in an optical data library and one or more sets of data stored in a spectral library, wherein the one or more sets of optical data correspond to a plurality of different fluid samples;
identify, based on the comparison, a first fluid sample from the plurality of different fluid samples that corresponds to at least a portion of the subsurface fluid;
determine an absorbance spectrum of the subsurface fluid based on the first fluid sample using a matching pursuit algorithm; and
adjust one or more drilling parameters based on the absorbance spectrum of the subsurface fluid.

18. The non-transitory computer-readable storage medium of claim 17, wherein each of the plurality of optical data measurements corresponds to a plurality of optical filters associated with the subsurface optical measurement device.

19. The non-transitory computer-readable storage medium of claim 17, wherein the one or more sets of optical data stored in the optical data library are obtained from a laboratory optical measurement device configured to operate as the subsurface optical measurement device.

20. The non-transitory computer-readable storage medium of claim 17, comprising further instructions which, when executed by the one or more processors, cause the one or more processors to:
identify, based on the comparison, a second fluid sample from the plurality of different fluid samples that corresponds to a residual portion of the subsurface fluid, wherein the absorbance spectrum of the subsurface fluid is based on the first fluid sample and the second fluid sample.

* * * * *